(12) United States Patent
Minerba et al.

(10) Patent No.: US 11,825,980 B2
(45) Date of Patent: Nov. 28, 2023

(54) CAPSULE DISTRIBUTING DEVICE WITH BULK LOADING

(71) Applicant: MITACA S.R.L., Robecchetto con Induno (IT)

(72) Inventors: Francesco Minerba, Robecchetto con Induno (IT); Angelo Bonizzoni, Robecchetto con Induno (IT)

(73) Assignee: MITACA S.R.L., Robecchetto con Induno (IT)

( * ) Notice: Subject to any disclaimer, the term of this patent is extended or adjusted under 35 U.S.C. 154(b) by 512 days.

(21) Appl. No.: 17/255,493

(22) PCT Filed: Jun. 28, 2019

(86) PCT No.: PCT/EP2019/067295
§ 371 (c)(1),
(2) Date: Dec. 23, 2020

(87) PCT Pub. No.: WO2020/002576
PCT Pub. Date: Jan. 2, 2020

(65) Prior Publication Data
US 2021/0369041 A1     Dec. 2, 2021

(30) Foreign Application Priority Data
Jun. 28, 2018   (IT) ......................... 102018000006749

(51) Int. Cl.
*A47J 31/36* (2006.01)
(52) U.S. Cl.
CPC ................. *A47J 31/3642* (2013.01)

(58) Field of Classification Search
CPC .... A47J 31/3642; A47J 31/24; A47J 31/3676; A47J 31/368; A47J 31/40; A47J 31/401;
(Continued)

(56) References Cited

U.S. PATENT DOCUMENTS

| 7,581,658 B2 * | 9/2009 | Mosconi | ............. A47J 31/3623 221/163 |
| 9,265,377 B2 * | 2/2016 | de Graaff | ................ A47J 42/50 |

(Continued)

FOREIGN PATENT DOCUMENTS

| EP | 2 617 333 | 7/2013 |
| WO | 2004/045350 | 6/2004 |

(Continued)

OTHER PUBLICATIONS

International Search Report for PCT/EP2019/067295 dated Jul. 30, 2019, 4 pages.

(Continued)

*Primary Examiner* — Michael Collins
(74) *Attorney, Agent, or Firm* — NIXON & VANDERHYE

(57) ABSTRACT

Disclosed is a device for distributing capsules with axial symmetry and irregular shape, including: a container apt to receive in bulk a plurality of capsules; an ordering assembly placed inside the container, apt to arrange the capsules vertically; an orientating assembly, apt to receive the capsules from the ordering assembly and to orientate them in a predetermined direction; and a conveying assembly apt to receive the capsules from the orientating assembly and to convey them towards a distribution outlet in a predetermined orientation.

20 Claims, 12 Drawing Sheets

(58) Field of Classification Search
CPC ...... A47J 31/402; A47J 31/404; A47J 31/405; A47J 31/407; A47J 31/408; A47J 31/41
USPC .................................. 221/92–133, 156–162
See application file for complete search history.

(56) References Cited

U.S. PATENT DOCUMENTS

| | | | |
|---|---|---|---|
| 9,974,411 B2* | 5/2018 | Righetti | B65G 47/1457 |
| 2014/0166686 A1* | 6/2014 | Righetti | A47J 31/3623 |
| | | | 221/162 |
| 2021/0259457 A1* | 8/2021 | Minerba | A47J 31/525 |

FOREIGN PATENT DOCUMENTS

| | | |
|---|---|---|
| WO | 2013/018066 | 2/2013 |
| WO | 2013/144761 | 10/2013 |

OTHER PUBLICATIONS

Written Opinion of the ISA for PCT/EP2019/067295 dated Jul. 30, 2019, 5 pages.

* cited by examiner

CAPSULE DISTRIBUTING DEVICE WITH BULK LOADING

CROSS-REFERENCE TO RELATED APPLICATIONS

This application is the U.S. national phase of International Application No. PCT/EP2019/067295 filed Jun. 28, 2019 which designated the U.S. and claims priority to IT 102018000006749 filed Jun. 28, 2018, the entire contents of each of which are hereby incorporated by reference.

BACKGROUND OF THE INVENTION

Field of the Invention

The object of the present invention is a capsule distributing device with bulk loading.

More particularly, but not exclusively, the device according to the invention can be used to precisely insert a capsule, for example of coffee or other products, into the distributing unit of a machine for the production of a drink.

Description of the Related Art

Here below we will mainly talk about coffee capsules, but it is clear that the concepts of the invention are applicable to any type of capsule.

There are currently capsule distributors, wherein the capsules are arranged in an orderly manner, and from which the user can take one capsule at a time to introduce it into the distributing unit of a beverage production machine.

These distributors with capsules arranged in an orderly manner could optionally feed directly the distribution unit of the coffee machine.

There are also capsule distributors with bulk loading.

WO 2004/045350 A1 discloses an apparatus for feeding capsules for beverage vending machines comprising a storage chamber for storing capsules in a random arrangement, pick-up means for picking up said capsules, a capsule transfer device provided with one or more compartments for said capsules, at least an unloading conveyor for unloading said capsules. Between the storage chamber and said at least an unloading conveyor, the apparatus comprises a first orientating device, which is adapted to orientate the capsules according to at least a substantially horizontal-axis position, and a second orientating device which is adapted to arrange the capsules according to a same vertical-axis position.

However, these distributors are rather bulky and with a somewhat complex structure.

SUMMARY OF THE INVENTION

It is therefore the object of the invention to eliminate, or at least reduce, the disadvantages of the prior art mentioned above.

More particularly, an object of the invention is that of providing a capsule distributor with bulk loading, wherein the capsules, having an axial symmetry and an irregular shape, are distributed with a very precise orientation.

Another object of the invention is to provide such a capsule distributor which is highly efficient, avoiding jamming of the capsules loaded in bulk during their path.

Yet another object of the invention is to provide such a capsule distributor which is of compact dimensions and which can easily be installed in machines for the distributing of coffee or other beverages.

These and other objects are achieved by the capsule distributor according to the invention which has the features of the appended independent claim 1.

Advantageous embodiments of the invention are disclosed by the dependent claims.

Substantially, the capsule distributing device with axial symmetry and irregular shape, according to the invention, comprises a container capable of accommodating in bulk a plurality of capsules;

an ordering assembly placed inside said container, capable of arranging said capsules vertically;

an orientating assembly, apt to receive the capsules from said ordering assembly and to orientate them in a pre-set direction;

a conveying assembly apt to receive the capsules from said orientating assembly and to convey them towards a distribution outlet in a pre-set orientation, wherein said ordering assembly comprises a rotating helical screw for mixing capsules, mounted on a rotating basket together with it, said basket having an inclined upper wall or slide, such that its height varies gradually from a minimum to a maximum along its periphery, and an open vertical seat apt to accommodate a capsule arranged vertically and to transfer it to the underlying orientating assembly.

BRIEF DESCRIPTION OF THE DRAWINGS

Further features of the invention will be made clearer by the detailed description that follows, referring to its purely example and non-limiting embodiments, illustrated in the accompanying drawings, in which.

DESCRIPTION OF THE PREFERRED EMBODIMENTS

Figure 1:
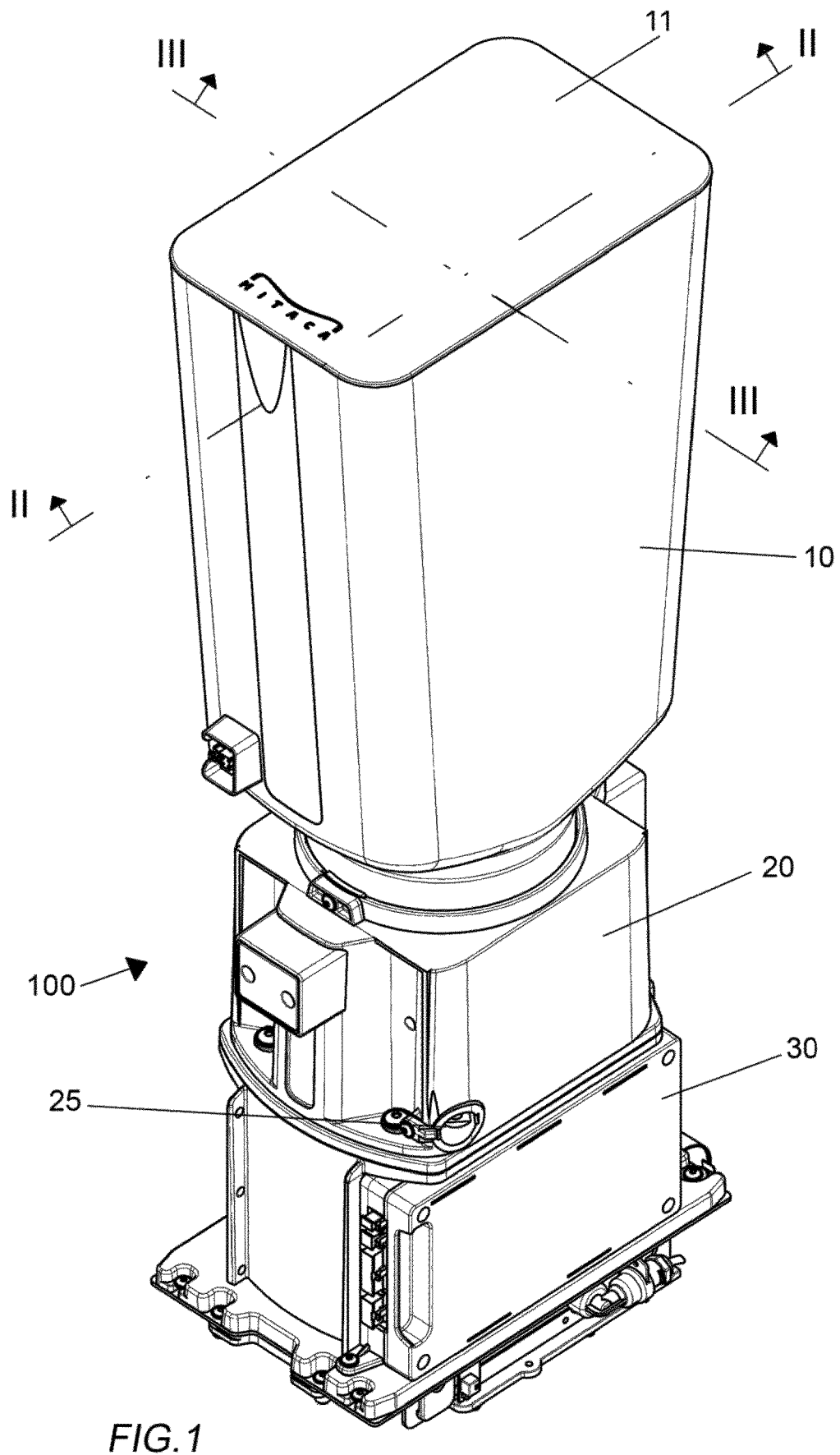
FIG. 1 is a perspective overall view of the device according to the invention.
Figure 2:
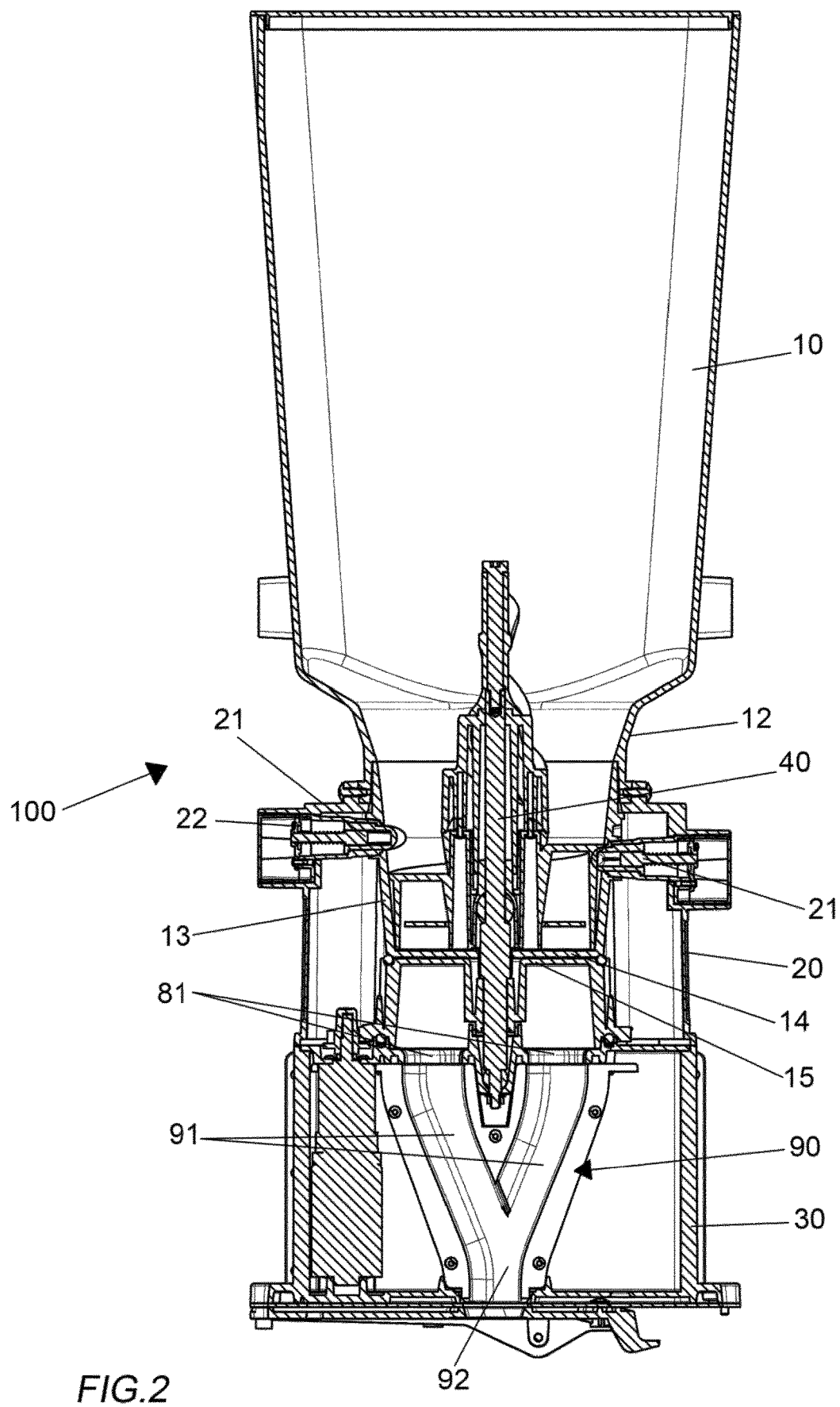
FIGS. 2 and 3 are sectioned views taken at 90° one in relation to the other, respectively along the planes of section II-II and III-III of FIG. 1.
Figure 3:
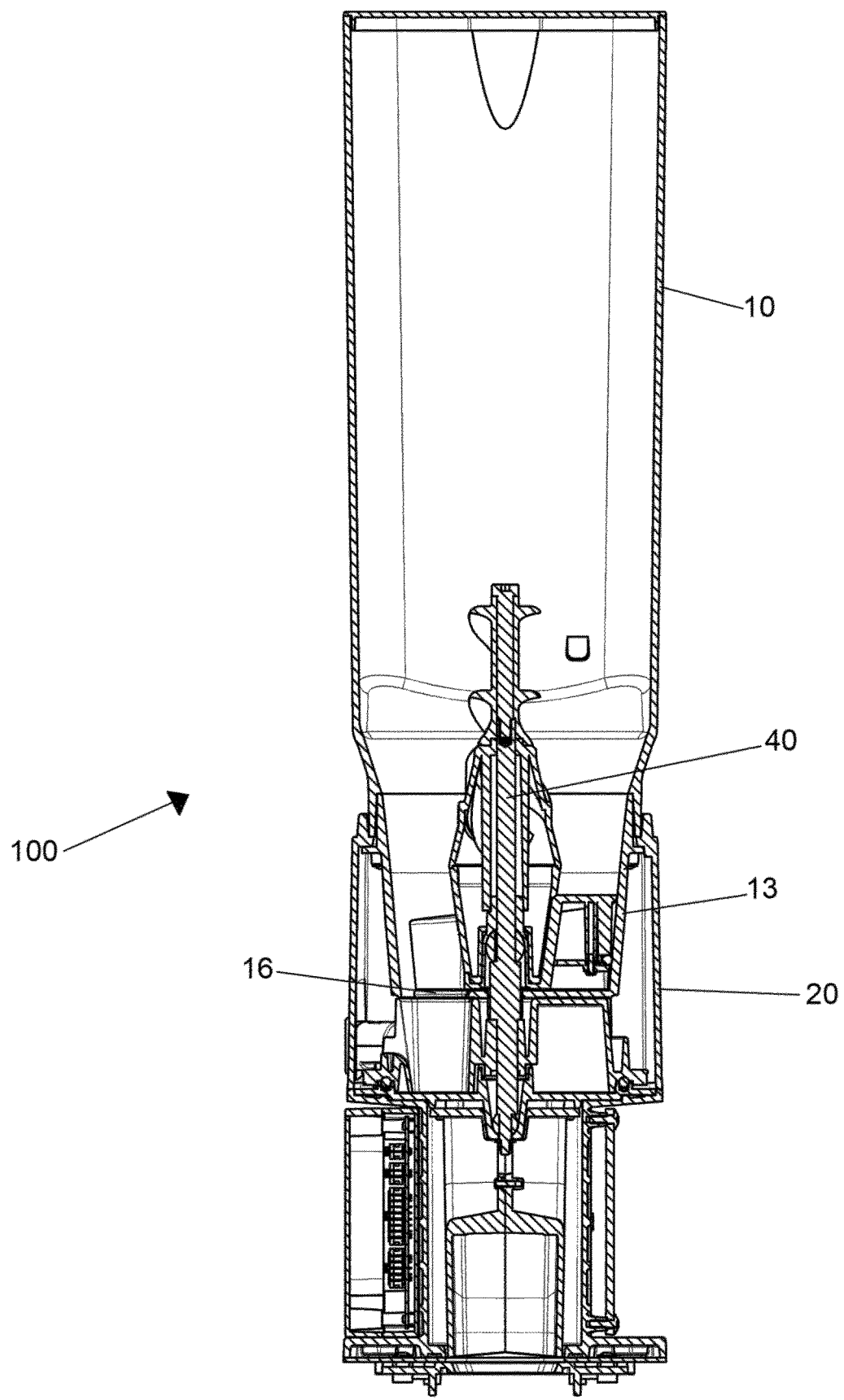

Referring to these drawings, and for the time being in particular to FIGS. 1 to 3, reference numeral 100 denotes, as a whole, the capsule distributing device according to the invention.

Figure 12:
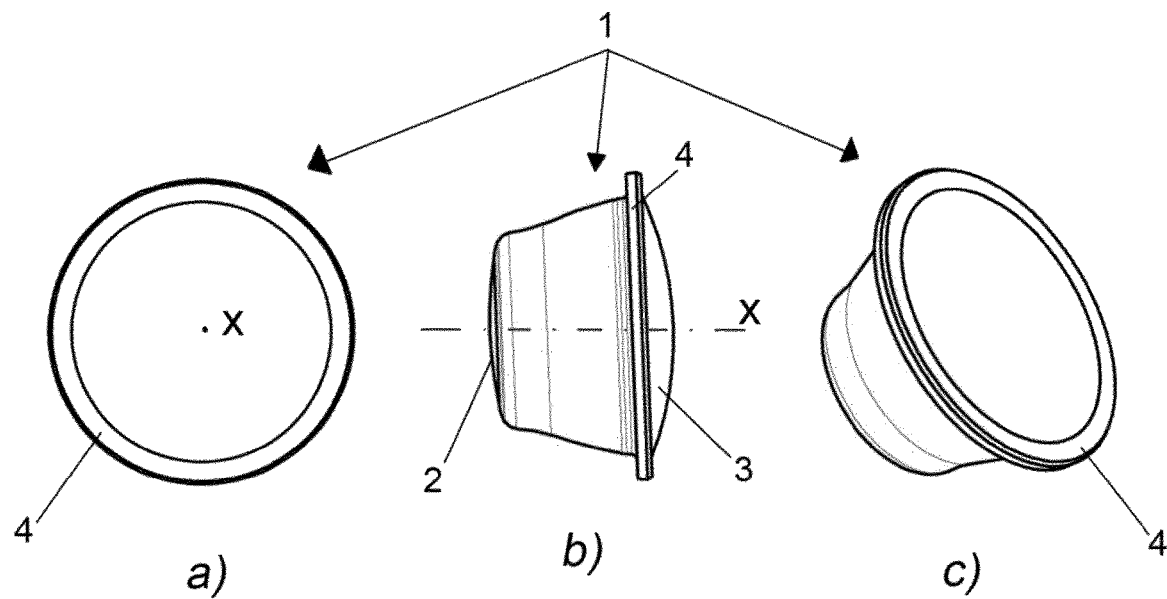
FIGS. 12a), b), c) are respectively plan, side and perspective views of a capsule that can be used in the device according to the invention.

A capsule that can be used in the device according to the invention is shown in FIGS. 12a, 12b and 12c which are respectively a plan view, a side view and a perspective view, where it is denoted by reference numeral 1.

The capsule is shown in a substantially truncated cone shape, with a symmetry around an X axis (FIG. 12b) and has a smaller base 2 and a larger base 3, at which there is an annular edge protruding outwards 4.

Here below, capsule 1 will be considered horizontally placed when it is in the position shown in FIG. 12a, i.e. with the X axis vertical, while it is considered vertically placed when it is in the position of the side view of FIG. 12b, i.e. with the X axis horizontal.

Naturally capsule 1 may have a different shape from that shown in FIGS. 12a-c, e.g. cylindrical, generally not perfectly regular for the purposes to be seen here below.

Here below in this description the capsule 10 will be called irregularly shaped to indicate that, when placed vertically, that is, with the X axis horizontal, it can enter a seat that reproduces the shape thereof only with a well-defined axial orientation and not, for example, if orientated in the opposite direction. In other words, capsule 10 is irregularly shaped in that it does not have a constant radial dimension.

The device according to the invention substantially comprises an assembly which we shall refer to as ordering, which serves to order the capsules, arranging them in a certain position, an assembly which we shall refer to as orientating, serving to orientate the capsules in a certain way and a conveying assembly which distributes the capsules with the correct orientation.

Capsules 1 are loaded in bulk, therefore with completely irregular and random packing in a tank or container 10, provided with a protective cover 11.

Container 10 has an almost parallelepiped shape, slightly tapered downwards, where it is connected to a cylindrical section 12 with a decreasing diameter, which is joined to a lower tank 13, with a substantially circular section, having a bottom wall 14, with a central circular hole 15 and a substantially rectangular opening 16 (see in particular FIG. 3), of such dimensions as to allow a capsule to pass easily through it, as will be seen below.

Naturally, container 10 can be different in shape from the one shown and is provided separate from tank 13 for simplicity of construction and ease of assembly.

The tank 13, together with other components of the device that will be mentioned here below, is housed in a cover cap 20 placed on an internally hollow base 30.

Through said central hole 15 of the bottom 14 of the tank 13, which is fixed to the cover cap 20, and then to the base 30, passes a shaft 40, on which is keyed a basket 50 with an inclined plane or upper slide 51, whose function will be described in greater detail below.

A helical screw 60 is mounted on the basket 50, also integral with the shaft 40.

The helical screw 60, which is used to mix the capsules 1 in the container 10, has an increasing diameter from its upper tip to the base which is embedded in the basket 50.

In the drawings the screw 60 is shown made in two parts that are assembled together, but it is clear that it can be made in one piece.

Basket 50 has no bottom and therefore has a side wall 52 with a circular section and the aforementioned inclined upper wall or slide 51 which has a ramp shape, such that the height of the basket 50 gradually varies from a minimum to a maximum along its periphery.

Figure 13:
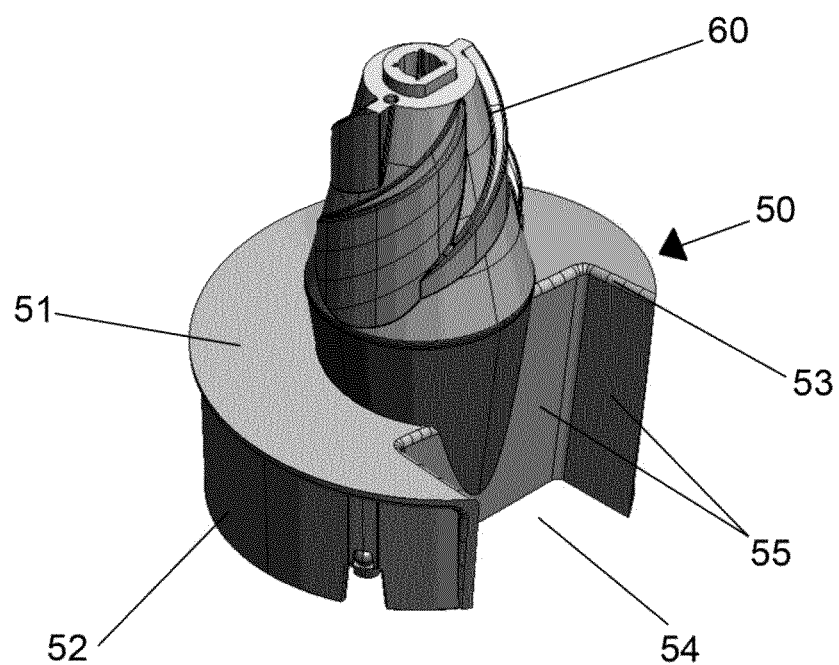
FIG. 13 is an enlarged perspective view of a detail of the assembly for ordering capsules vertically of the device according to the invention.

As can be seen more clearly in the enlargement of FIG. 13, the side wall 52 has an interruption, at which the inclined ramp shape upper wall 51 has a large opening 53, such as to determine a seat 54 inside the basket, bounded by vertical walls 55, apt to accommodate a capsule 1 arranged vertically.

In the cap 20, under the basket 50, a dome-shaped body 70 is placed, in which the shaft 40 is keyed, and carrying below a gear 71, which can be actuated in rotation by a pinion 72 of a geared motor 73.

The dome-shaped body 70 has a vertical through opening 74 placed in alignment with the aforementioned seat 54 of the basket 50, and apt to accommodate a capsule 1. On the side wall of the dome 70, at said vertical through opening 74, a slit 75 is provided.

Below the dome-shaped body 70 with gear 71 a plate 80 is placed, provided with two aligned openings 81 orientated in the same direction and reproducing the shape of a capsule 1 placed vertically.

Below plate 80 a Y-shaped conveyor 90 is placed, comprising two ducts 91, which start from the above-mentioned openings 81 of the plate 80 and flow towards a single outlet duct 92, from which the capsules are distributed with a very precise orientation, as will be explained in greater detail here below, to the distributing assembly of a machine for the production of drinks.

In the cap 20, in approximately diametrically opposed positions, two pushers 21 are inserted, protruding inside the tank 13 under the action of elastic means 22.

As can be seen, for example, in FIG. 2, said pushers 21 are placed at a level corresponding to the inclined plane 51 of the basket 50, such that, depending on the angular position of the basket 50, one of the two pushers 21, placed at the part of smaller height of the basket, protrudes inside the tank 13, while the other one is made to withdraw into the cap 20 at the part of greater height of the basket.

The operation of the device according to the invention for ordering, orientating and distributing capsules is now described.

Actuation of the geared motor 73 rotates the gear 71 of the dome-shaped body 70 by means of the pinion 72, and therefore the shaft 40 on which it is keyed, making the basket 50 and the helical screw 60 rotate synchronously.

The rotation of the helical screw 60 performs a mixing of the capsules 1 inserted in the container 10, facilitating the fall thereof into the tank 13.

The increase in diameter of the screw 60 towards its base reduces the distance between it and the side wall of the tank 13, such that a capsule 1 can enter the space between the screw and the side wall of the tank and therefore in the tank 13, accompanied by the rotation movement of the helical screw, only in the vertical direction, i.e. with the X axis horizontal, the maximum radial dimension of the capsule being greater than the axial one.

During the rotation of the basket 50, which is clockwise with reference to the accompanying drawings, a capsule 1 falls into the seat 54 of the basket through the upper opening 51, and is dragged onto the bottom 14 of the tank.

Figure 5:
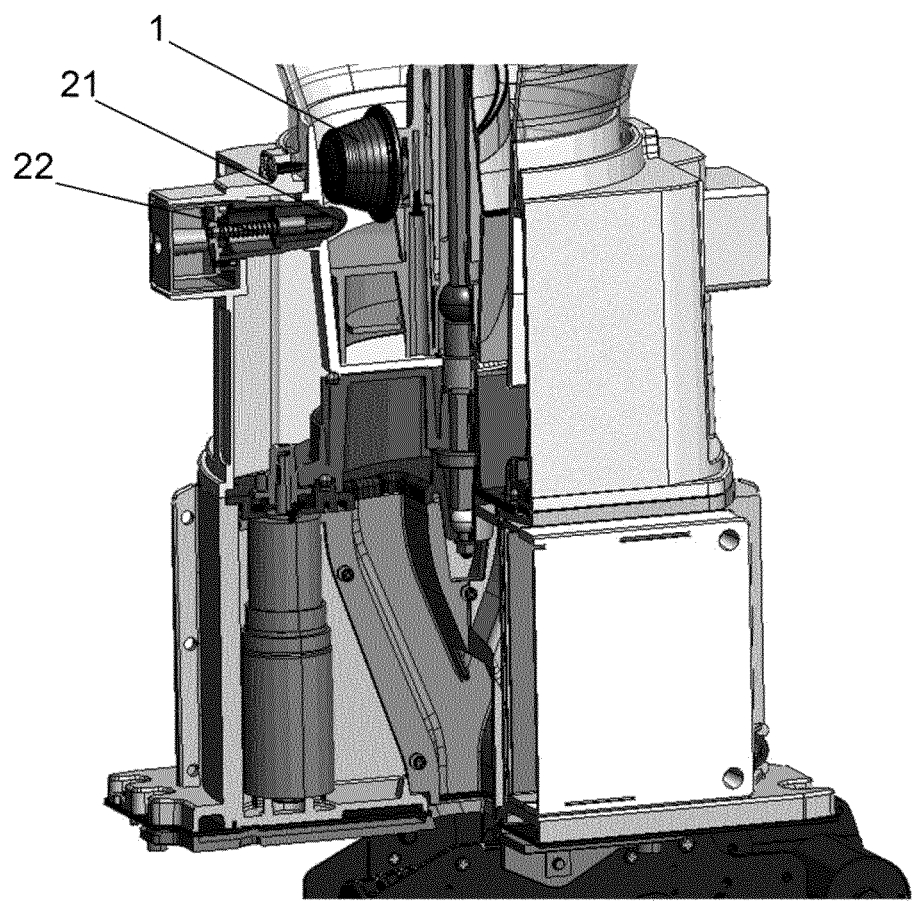
FIGS. 5 to 9 are partially cross section views like that of FIG. 4, showing successive positions of a capsule until insertion in the distributing assembly of a machine for preparing a drink.

To prevent a second capsule from partially entering the seat 54 in the basket and causing any jams, the abovementioned pushers 21 intervene, as for example shown in FIG. 5.

In fact, such a situation could occur when, during the rotation of the basket 50, a capsule 1 in the tank 13 is in the transition zone between the part of smaller height and the part of greater height of the basket, where the seat 54 is formed.

To avoid this, pusher 21 protrudes into tank 13, where basket 50 is lower in height, and lifts a capsule 1 located in that zone, as shown in FIG. 5, bypassing the aforementioned transition zone during the rotation of the basket and preventing it from partially inserting itself into seat 54 of the same.

The pusher 21 shown in FIG. 5 withdraws into the cap 20, in contrast to the action of the spring 22, when it interferes with the highest part of the basket.

The same situation occurs with the other pusher 21 placed at about 180° from the previous one.

It has been verified that the provision of two pushers optimally solves the problem of capsule jamming.

Figure 6:
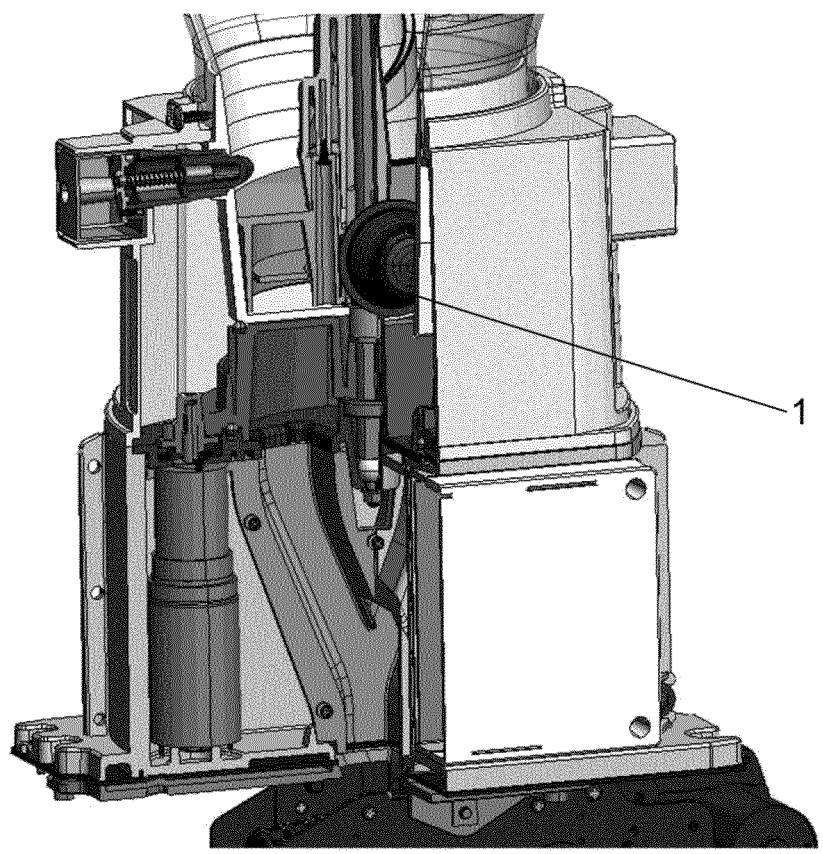

FIG. 6 shows a capsule 1 placed vertically in the seat 54 of the basket 50, during transport on the bottom 14 of the tank 13.

It should be noted that FIGS. 5 to 9 are "fictitious" views showing the device in a static situation, i.e. with the rotating assembly always in the same position, with a capsule shown in different positions, until delivery to the distributing assembly of an infusion machine.

Figure 7:
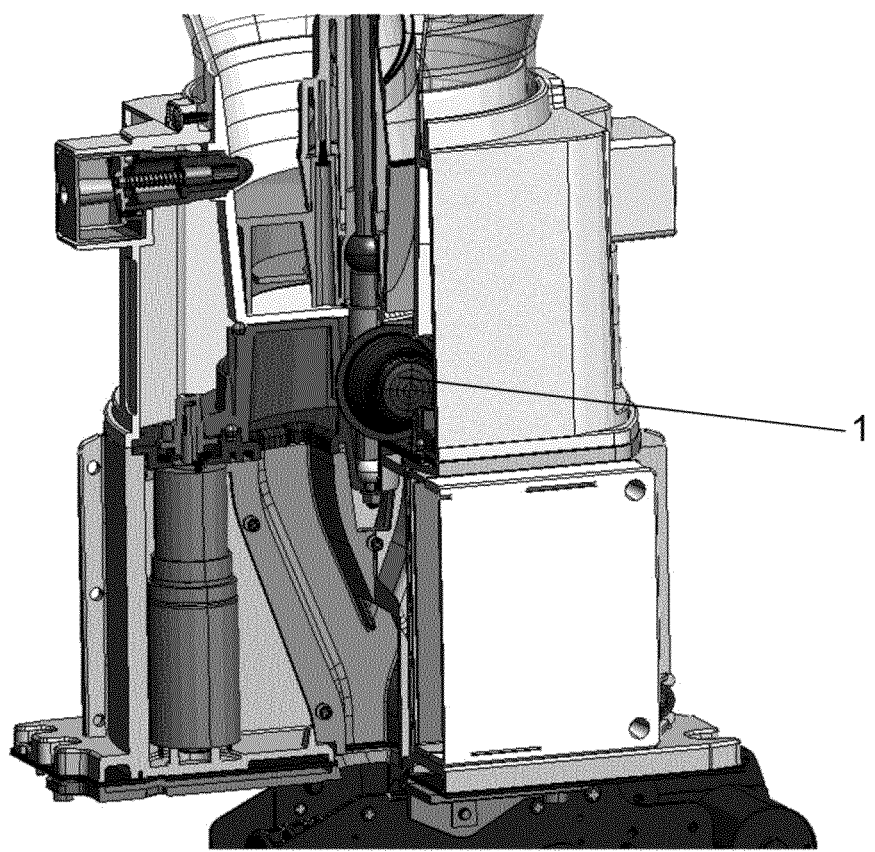

During the rotation of the basket 50, which takes place integrally to the underlying dome-shaped body 70, the capsule 1 placed in the seat 54, at a certain point, is located at the opening 16 provided on the bottom 14 of the tank 13, falling into the corresponding opening 74 of the dome-shaped body 70, which is in perfect alignment with the seat 54. The situation is schematically shown in FIG. 7.

Up to this point, capsule 1 is located on plate 80 located above the Y-shaped conveyor 90, in which plate two aligned openings 81 are provided, orientated in the same direction and reproducing the vertical shape of a capsule 1.

The capsules, after transiting from container 10 along the basket 50 and in the dome-shaped body 70, arrive on the plate 80 placed in a vertical position but with a random orientation, that is, in the case of capsules with a substantially truncated cone shape, as shown in the drawings, with the larger base turned indifferently in one direction or another.

Therefore, depending on how the capsule is orientated, it enters one or the other of the two shaped openings 81.

Figure 8:
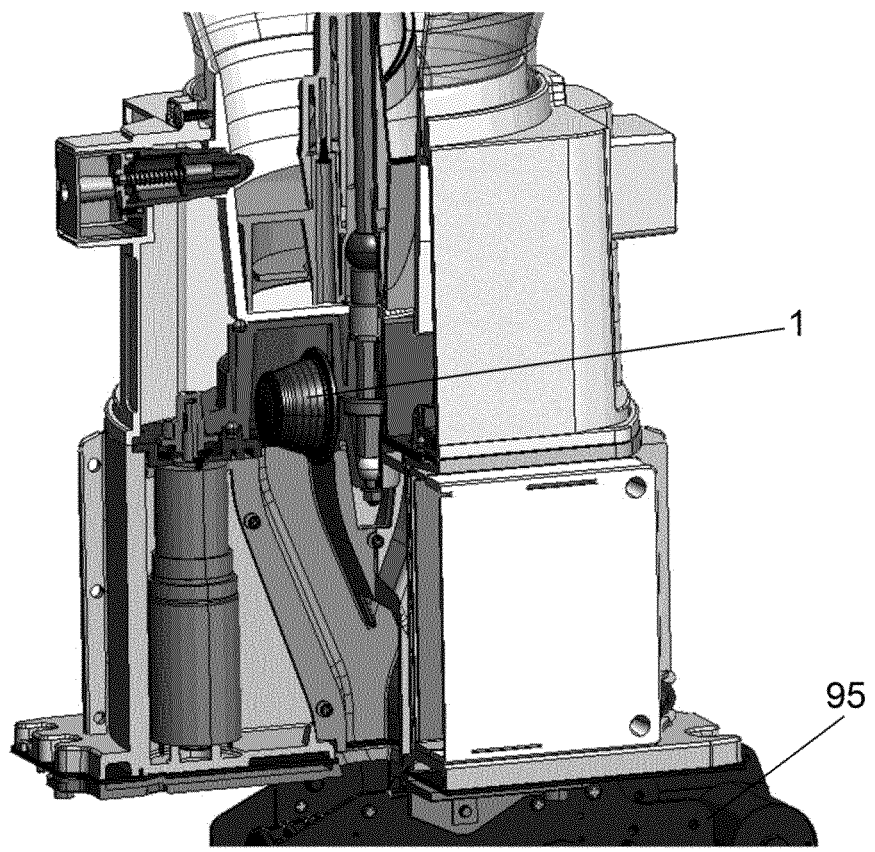
Figure 11:
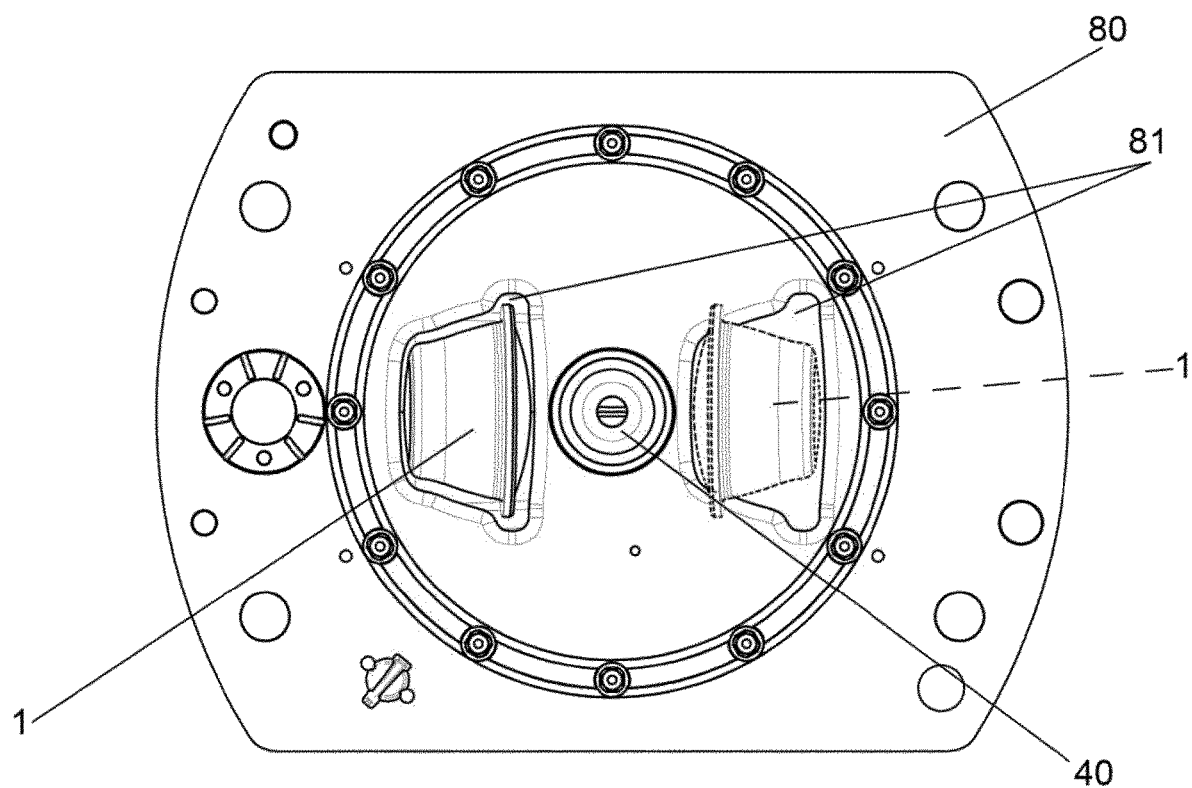
FIG. 11 is a plan view from above of the capsule conveyor towards the outlet, to better show how they are orientated.

In practice, if the capsule 1 falls on the plate 80 with an orientation as shown by dotted lines in FIG. 11, during the rotation of the dome-shaped body 70 it goes over the shaped opening 81 on the right in FIG. 11 and continues towards the opening 81 on the left, where it is correctly orientated, so that it can enter therein, as shown in FIGS. 8 and 11.

Figure 9:
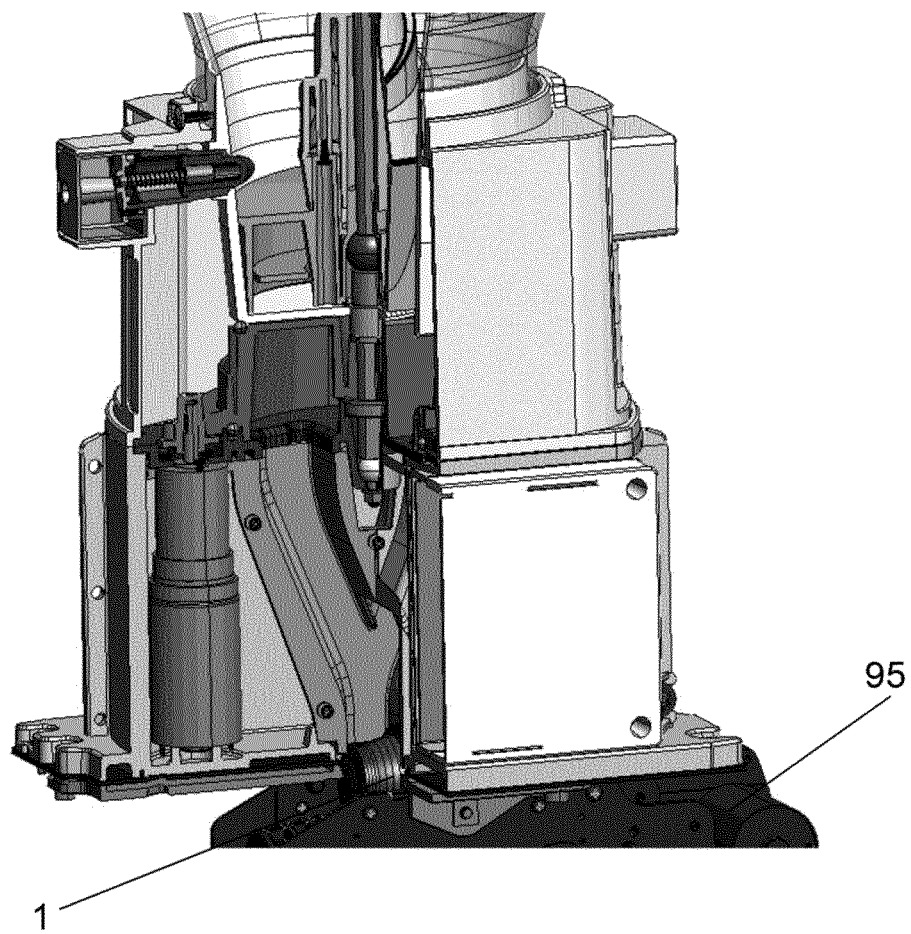
Figures 10A, 10B:
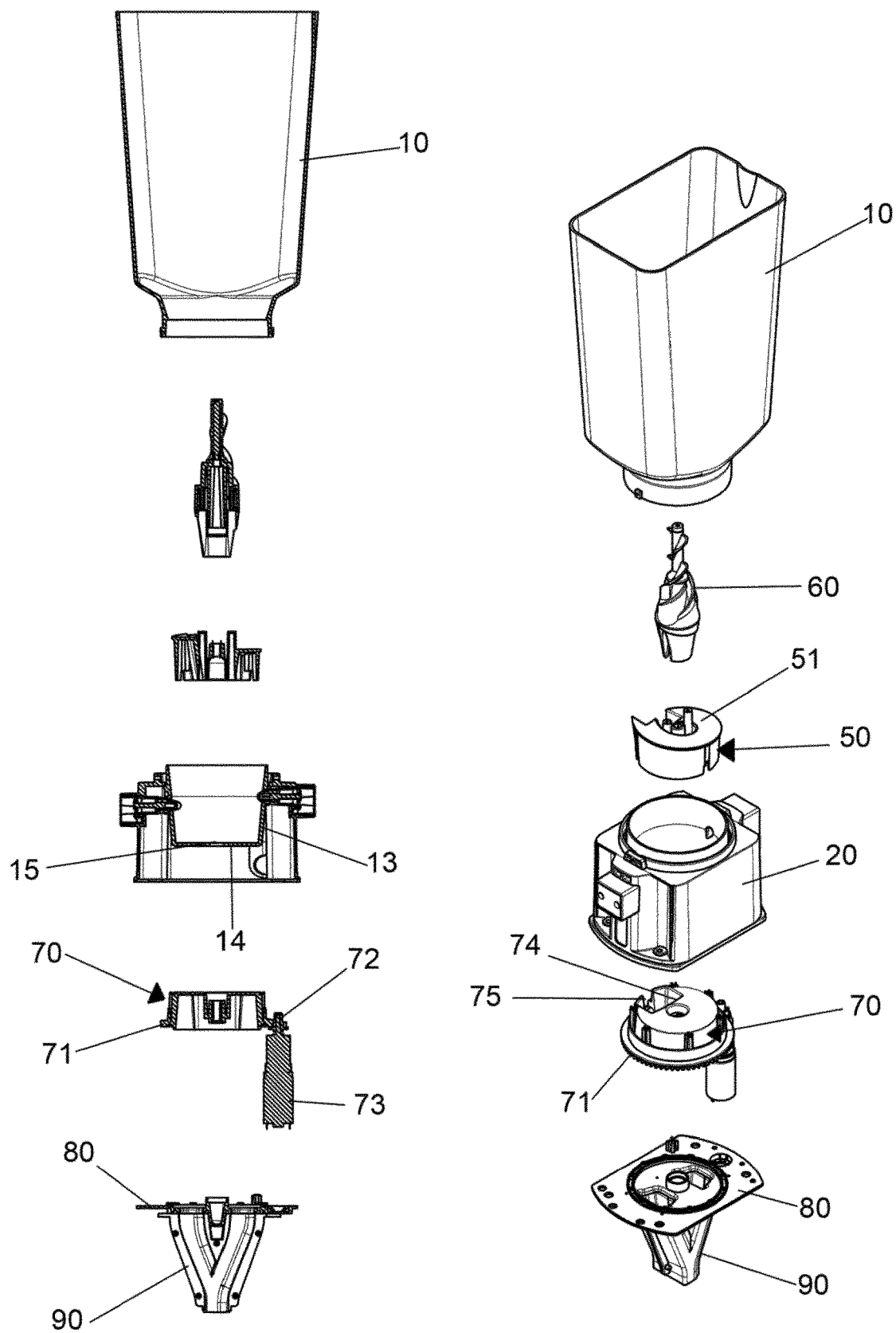
FIGS. 10a and 10b are blown-up views, respectively in perspective and section, showing the various components on the opposite side with respect to the previous drawings.

In the position shown in FIG. 8, capsule 1 falls into duct 91 on the left, flowing into outlet duct 92 to be fed to the distributing assembly 95, only schematically and partially shown in FIG. 9, of a machine for the production of a drink.

The device according to the invention can be connected to a control logic such that, for example, on command from a user, by activating an appropriate button, a capsule is distributed.

Figure 4:
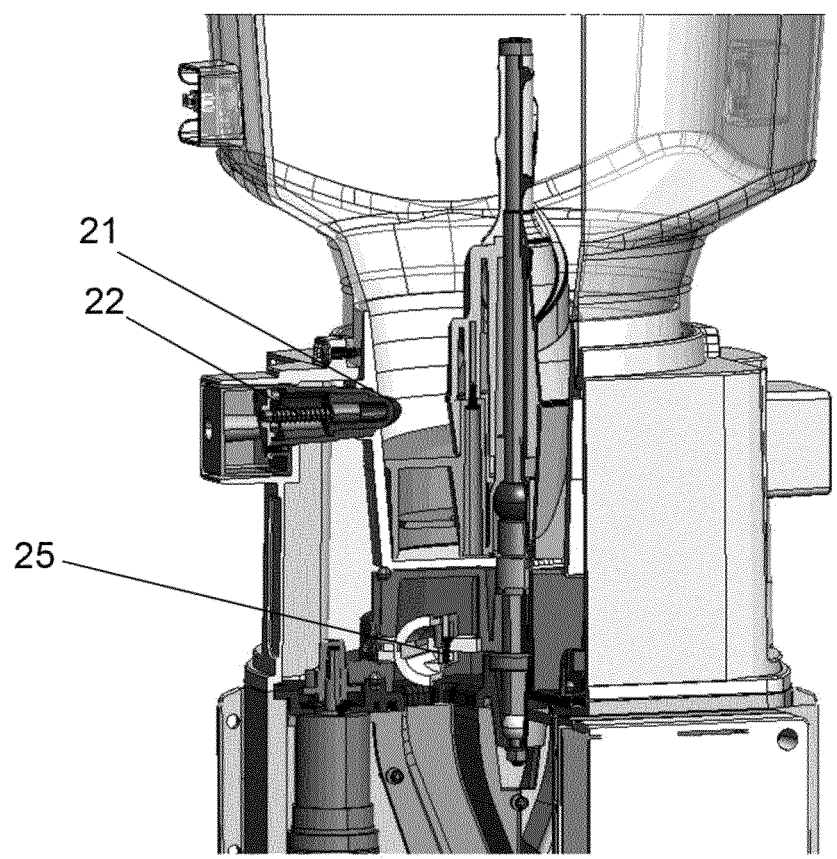
FIG. 4 is a partially cross section view to better show the main assemblies of the device.

For this purpose, a presence sensor 25, shown in FIG. 1 and in the cross section of FIG. 4, is placed in cap 20 to detect the presence of a capsule on plate 80, through the slit 75 of the side wall of the dome 70, stopping the rotation of the gear 71.

In this way, a capsule 1 is prepared in order to enter one of the two ducts 91 of the Y-shaped conveyor 90 at the next command given by the user and a new capsule is prepared for the next pickup.

Naturally the position of the sensor 25 is such that the capsule is stopped on the plate 80 in a position where no shaped openings 81 are provided.

The advantages of the device according to the invention appear clear from the above which, starting from capsules loaded in bulk, is able to order and orientate them so as to be individually fed to the distributing assembly of a machine for the production of a drink.

The device according to the invention could be used not in combination with a machine for the production of beverages, acting as a distributor of orientated capsules.

The device according to the invention could optionally comprise only the capsule ordering assembly, i.e. without the Y-shaped conveyor and the rotating dome, in which case the capsules are distributed, arranged vertically, but without a specific orientation, falling from the basket 50 through the opening 16 provided in the bottom wall 14 of the tank 13.

In a particular application, several devices 100 according to the invention can be placed side by side and placed in a distributor machine.

Naturally the invention is not limited to the particular embodiment previously described and illustrated in the accompanying drawings, but numerous detail changes may be made thereto within the reach of the person skilled in the art, without thereby departing from the scope of the invention itself, as defined in the appended claims.

The invention claimed is:

1. Device (100) for distributing capsules with axial symmetry and irregularly shaped in that they do not have a constant radial dimension, comprising a container (10) able to receive in bulk a plurality of capsules (1);
    an ordering assembly arranged inside said container (10), apt to vertically arrange said capsules (1);
    an orientating assembly, apt to receive the capsules (1) from said ordering assembly and to orientate them in a predetermined direction;
    a conveying assembly apt to receive the capsules (1) from said orientating assembly and to convey them towards a distribution outlet in a predetermined orientation,
wherein
said ordering assembly comprises a rotating helical screw (60) for stirring capsules, mounted on a basket (50) rotating with it, said basket (50) having an inclined upper wall or slide (51), such that its height varies gradually from a minimum to a maximum along its periphery, and an open vertical seat (54) suitable for receiving a capsule (1) arranged vertically and transferring it to the orientating assembly below.

2. The device (100) according to claim 1, wherein the distance between the base of said helical screw (60) and the side wall of the container (10) is such that it can accommodate a capsule (1) only if arranged vertically, the maximum radial dimension of the capsule being greater than the axial one.

3. The device (100) according to claim 1, wherein said basket (50) is housed in a lower tank (13) of said container (10), provided with an opening (16) on its bottom wall (14), of such dimensions as to allow a capsule to pass through it.

4. The device (100) according to claim 1, further comprising at least one pusher (21) projecting internally of said container (10) under the action of elastic means (22) at a level corresponding to said inclined plane (51) of the basket (50), so as to lift a capsule preventing it from overlapping another capsule present in said seat (54) of the basket, and returning when it interferes with the higher part of the basket during rotation thereof.

5. The device (100) according to claim 1, wherein said orientating assembly comprises a dome-shaped body (70) rotating in synchronism with said basket (50), and having a through opening (74) in alignment with said seat (54) of the basket (50), apt to receive a capsule (1) arranged vertically and to transfer it to an underlying plate (80) provided with two aligned openings (81), orientated in the same direction and reproducing the shape of a capsule arranged vertically, each one apt to receive a capsule (1) from said dome-shaped body during its rotation, according to the random orientation wherein the capsule is arranged in the opening (74) of the dome-shaped body (70).

6. The device (100) according to claim 5, wherein said conveying assembly is made up of a Y-shaped structure (90) comprising two ducts (91) which depart from the aforesaid openings (81) of the plate (80) and flow towards a single outlet duct (92) with the orientation determined by said openings (81).

7. The device (100) according to claim 5, further comprising a sensor (25) placed in a cover cap of said ordering and orientating assemblies, apt to detect the presence of a capsule on said plate (80) through a slit (75) on the side wall of said dome-shaped body (70) at said vertical through opening (74).

8. The device (100) according to claim 5, wherein said dome-shaped body (70) carries a gear (71) at its base which can be rotated by a pinion (72) of a geared motor (73), said dome-shaped body (70) being keyed on a shaft (40) on which said basket (50) is also keyed with the helical screw (60).

9. The device (100) according to claim 1, mounted on a beverage production machine, so that said capsules (1) are fed with a predetermined orientation to the distributing assembly of such a machine.

10. The device (100) according to claim 2, wherein said basket (50) is housed in a lower tank (13) of said container (10), provided with an opening (16) on its bottom wall (14), of such dimensions as to allow a capsule to pass through it.

11. The device (100) according to claim 2, further comprising at least one pusher (21) projecting internally of said container (10) under the action of elastic means (22) at a level corresponding to said inclined plane (51) of the basket (50), so as to lift a capsule preventing it from overlapping another capsule present in said seat (54) of the basket, and returning when it interferes with the higher part of the basket during rotation thereof.

12. The device (100) according to claim 3, further comprising at least one pusher (21) projecting internally of said container (10) under the action of elastic means (22) at a level corresponding to said inclined plane (51) of the basket (50), so as to lift a capsule preventing it from overlapping another capsule present in said seat (54) of the basket, and returning when it interferes with the higher part of the basket during rotation thereof.

13. The device (100) according to claim 2, wherein said orientating assembly comprises a dome-shaped body (70) rotating in synchronism with said basket (50), and having a through opening (74) in alignment with said seat (54) of the basket (50), apt to receive a capsule (1) arranged vertically and to transfer it to an underlying plate (80) provided with two aligned openings (81), orientated in the same direction and reproducing the shape of a capsule arranged vertically, each one apt to receive a capsule (1) from said dome-shaped body during its rotation, according to the random orientation wherein the capsule is arranged in the opening (74) of the dome-shaped body (70).

14. The device (100) according to claim 3, wherein said orientating assembly comprises a dome-shaped body (70) rotating in synchronism with said basket (50), and having a through opening (74) in alignment with said seat (54) of the basket (50), apt to receive a capsule (1) arranged vertically and to transfer it to an underlying plate (80) provided with two aligned openings (81), orientated in the same direction and reproducing the shape of a capsule arranged vertically, each one apt to receive a capsule (1) from said dome-shaped body during its rotation, according to the random orientation wherein the capsule is arranged in the opening (74) of the dome-shaped body (70).

15. The device (100) according to claim 4, wherein said orientating assembly comprises a dome-shaped body (70) rotating in synchronism with said basket (50), and having a through opening (74) in alignment with said seat (54) of the basket (50), apt to receive a capsule (1) arranged vertically and to transfer it to an underlying plate (80) provided with two aligned openings (81), orientated in the same direction and reproducing the shape of a capsule arranged vertically, each one apt to receive a capsule (1) from said dome-shaped body during its rotation, according to the random orientation wherein the capsule is arranged in the opening (74) of the dome-shaped body (70).

16. The device (100) according to claim 6, further comprising a sensor (25) placed in a cover cap of said ordering and orientating assemblies, apt to detect the presence of a capsule on said plate (80) through a slit (75) on the side wall of said dome-shaped body (70) at said vertical through opening (74).

17. The device (100) according to claim 6, wherein said dome-shaped body (70) carries a gear (71) at its base which can be rotated by a pinion (72) of a geared motor (73), said dome-shaped body (70) being keyed on a shaft (40) on which said basket (50) is also keyed with the helical screw (60).

18. The device (100) according to claim 7, wherein said dome-shaped body (70) carries a gear (71) at its base which can be rotated by a pinion (72) of a geared motor (73), said dome-shaped body (70) being keyed on a shaft (40) on which said basket (50) is also keyed with the helical screw (60).

19. The device (100) according to claim 2, mounted on a beverage production machine, so that said capsules (1) are fed with a predetermined orientation to the distributing assembly of such a machine.

20. The device (100) according to claim 3, mounted on a beverage production machine, so that said capsules (1) are fed with a predetermined orientation to the distributing assembly of such a machine.

* * * * *